US012726407B1

(12) United States Patent
Mahalingam et al.

(10) Patent No.: US 12,726,407 B1
(45) Date of Patent: Sep. 1, 2026

(54) CONFIGURATION REPLICATION IN NETWORK FABRICS

(71) Applicant: Dell Products L.P., Round Rock, TX (US)

(72) Inventors: Venkatesan Mahalingam, Pleasanton, CA (US); Senthil Kumar Ganesan, San Ramon, CA (US); Vinoth Kumar Arumugam, Fremont, CA (US); Udhaya chandran Shanmugam, Santa Clara, CA (US); Pawan Kumar Singal, Milpitas, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/186,726

(22) Filed: Apr. 23, 2025

(51) Int. Cl.
*H04L 41/084* (2022.01)
*H04L 9/40* (2022.01)

(52) U.S. Cl.
CPC .......... *H04L 41/0843* (2013.01); *H04L 63/08* (2013.01)

(58) Field of Classification Search
CPC ............................ H04L 41/0843; H04L 63/08
See application file for complete search history.

(56) References Cited

U.S. PATENT DOCUMENTS 8,326,978 B2 * 12/2012 Bharadwaj .......... H04L 67/1097 709/224
10,073,706 B2 * 9/2018 Felts .................. G06F 9/44505
10,673,781 B2 * 6/2020 Marichetty ......... H04L 12/4641
11,012,303 B2 * 5/2021 Berry ...................... H04L 67/75
2004/0019662 A1 * 1/2004 Viswanath ............. G06F 9/505 709/220
2007/0157010 A1 * 7/2007 Zenz .................. G06F 9/44505 713/1
2007/0157172 A1 * 7/2007 Zenz .................. G06F 9/44505 717/121
2011/0040875 A1 * 2/2011 Scholz .................. G06Q 10/10 709/225

(Continued)

OTHER PUBLICATIONS

Nakagawa, et al., Automated Migration of Port Profile for Multi-Level Switches, Proceeding, DC-CaVES '11 Proceedings of the 3rd Workshop on Data Center—Converged and Virtual Ethernet Switching, pp. 22-29. (Year: 2011).*

*Primary Examiner* — Oanh Duong
(74) *Attorney, Agent, or Firm* — Chamberlain, Hrdlicka, White, Williams & Aughtry; Aly Z. Dossa

(57) ABSTRACT

A method for automating replication of network switch configurations within network fabrics, the method includes: obtaining, by a master switch, templates and variables from an administrative system, where a network fabric includes switches and where the master switch is one of the switches assigned a role of master. Additionally, the method includes identifying, by the master switch and in response to the obtaining, a group of switches within the network fabric, authenticating, by the master switch, the group of switches, and generating, by the master switch and based upon the group of authenticated switches, at least one switch profile using the templates and the variables. Further, the method includes applying, by the master switch, the at least one switch profile to the master switch to obtain a configured master switch and applying, by the configured master switch, the at least one switch profile to the group of authenticated switches.

20 Claims, 7 Drawing Sheets

(56) References Cited

U.S. PATENT DOCUMENTS

2011/0173302 A1* 7/2011 Rider .................. H04L 41/0803 709/220
2011/0196958 A1* 8/2011 Bharadwaj .......... H04L 41/0681 709/224
2015/0207682 A1* 7/2015 Moraes Nichele ... G06F 15/177 709/221
2016/0191316 A1* 6/2016 Guntaka ............... H04L 41/082 370/254
2019/0238539 A1* 8/2019 Arora .................... H04L 63/162
2021/0099380 A1* 4/2021 Suryanarayana ....... H04L 12/18
2021/0294702 A1* 9/2021 Guim Bernat ...... G06F 11/1451

* cited by examiner

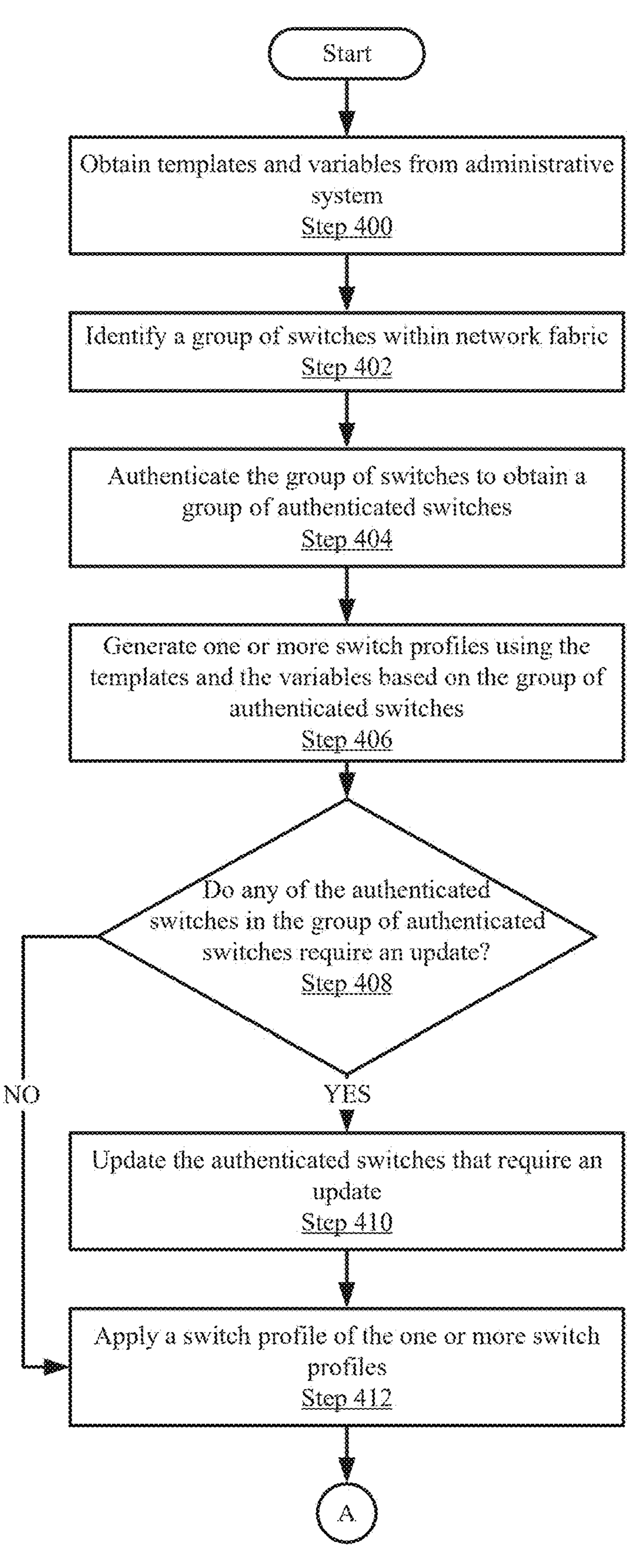
FIG. 4.1

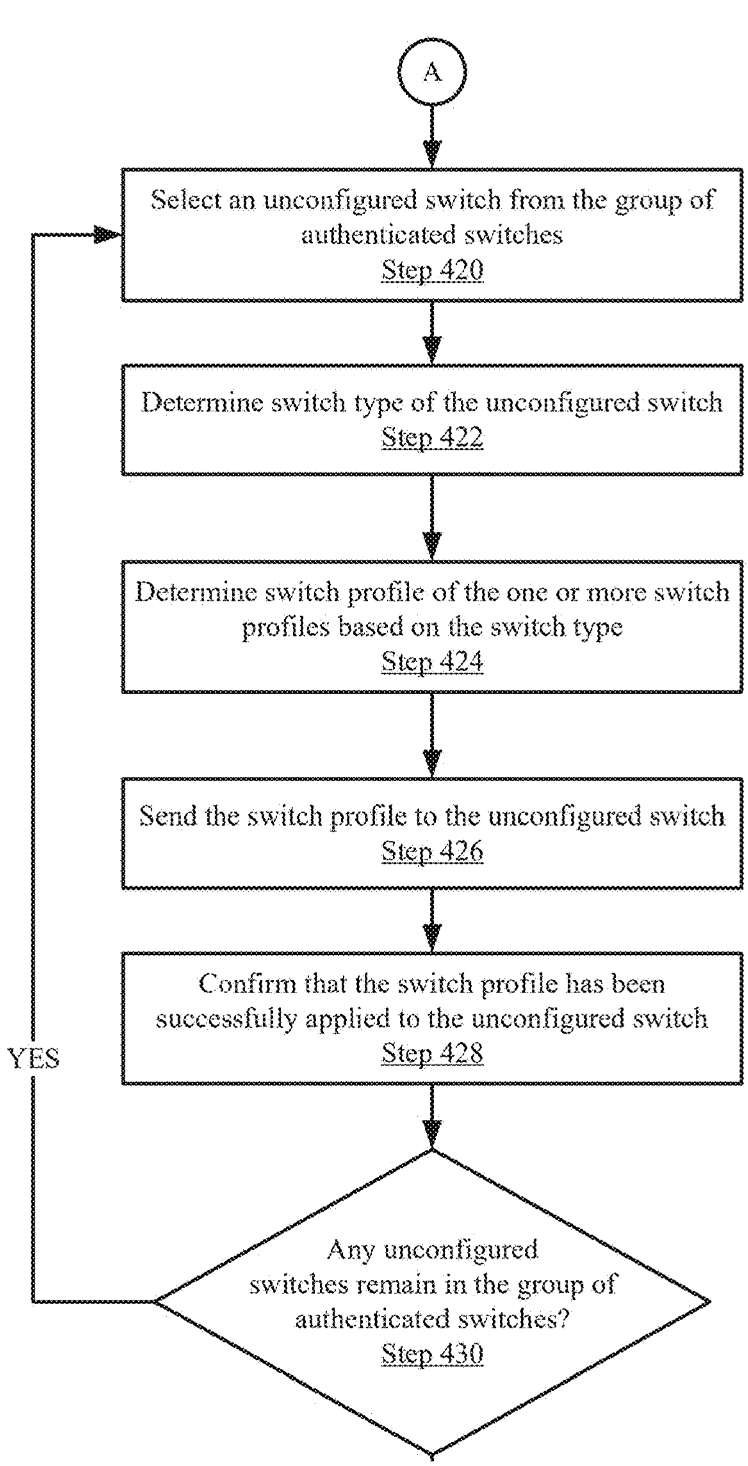
FIG. 4.2

CONFIGURATION REPLICATION IN NETWORK FABRICS

BACKGROUND

Network fabrics play a critical role in computing systems by enabling communication between interconnected devices. These fabrics are composed of numerous switches, each physically linked through extensive cabling infrastructure. When these fabrics are set up, the switches often need to be manually configured, which is a time-consuming task. Additionally, as new switches are added to the network, each new switch requires configuration.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

FIG. 4.1 shows a flowchart of a method for generating switch profiles in a network fabric in accordance with one or more embodiments.

FIG. 4.2 shows a flowchart of a method for applying switch profiles to switches in a network fabric in accordance with one or more embodiments.

DETAILED DESCRIPTION

In today's rapidly advancing technological landscape, network fabrics, whether utilized for standard data access, storage solutions, or AI scale-out scenarios, are predominantly provisioned manually. This manual provisioning process becomes increasingly cumbersome and time intensive as the scale of the network expands. Network administrators or service providers are tasked with configuring each switch, which can significantly delay the deployment and increase the potential for errors. Further, automated solutions often require the use of an external controller or orchestrator to configure devices within a network fabric and struggle to handle automation frameworks. Further, such automated solutions may not be usable in certain implementations due to location limitations such as edge or air-gapped environments and security constraints. In light of these challenges, there is a need for a solution to enable efficient, scalable, and configurable management of network fabrics.

To address these issues, the disclosure provides a network fabric with mechanisms for autonomously replicating switch configurations across multiple switches of the network fabric using a master switch. Further, the solution provides self-healing capabilities, whereby the master switch periodically verifies the operational states of each switch by comparing it against an expected configuration baseline and automatically initiating updates or corrections as needed. This solution not only reduces the burdens on administrators but also increases reliability consistency and deployment speed particularly in complex or air gapped environments.

Specific embodiments will now be described with reference to the accompanying figures.

Figure 1:
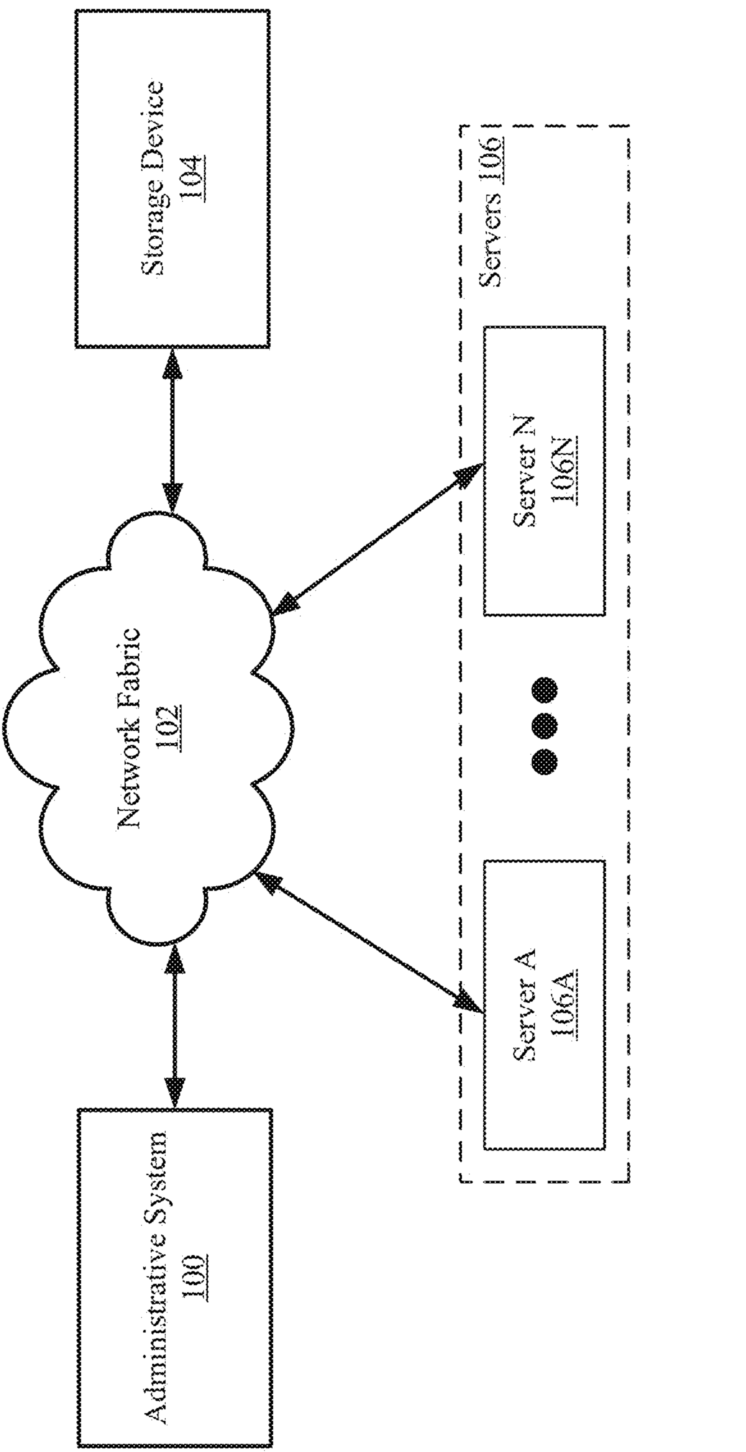
FIG. 1 shows a diagram of a system in accordance with one or more embodiments.

FIG. 1 shows a system in accordance with one or more embodiments. The system may include an administrative system (100), a network fabric (102), a storage device (104), and servers (106). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the administrative system (100), the storage device (104), and the servers (106) may be operatively connected to one another through the network fabric (102) (e.g., a local area network (LAN), a wide area network (WAN) such as the Internet, a mobile network, any other network type, or a combination thereof). Further, the network (102) may encompass various interconnected, network-enabled subcomponents (or systems) (e.g., leaf switches of leaf tier (206 in FIG. 2), spine switches of spine tier (204 in FIG. 2), super spine switches of leaf tier (202 in FIG. 2), etc.) that may facilitate communications between the aforementioned components. Moreover, the administrative system (100), the storage device (104), and the servers (106) may communicate with one another using any combination of wired and/or wireless communication protocols. In one or more embodiments, the In one or more embodiments, the administrative system (100) includes the functionality to generate templates and variables for switches in the network fabric (102). In one or more embodiments, the administrative system (100) generates the templates and the variables by any means known in the art or discovered in the future. In one or more embodiments, a switch (i.e, a network switch) is a physical, high-performance device configured to connect network servers, storage devices, and other network appliances within enterprise (e.g., on-premises and/or cloud computing infrastructure) environments. Said connection between enterprise environment elements may be implemented over one or more networks (e.g., local area networks (LANs), wide area networks (WANs) such as the Internet, mobile networks, etc.). In one or more embodiments, a template refer to a predefined configuration used to standardize switch configurations across the network fabric (102), which can be tailored to each switch with specific variables. In one or more embodiments, variables refer to information specific to the switches in the network fabric (i.e., ASN numbers, router IDs, etc.). In one or more embodiments, the variables can be consistent within each type of switch (e.g., leaf switches, spine switches, super spine switches, etc.) or vary for each switch. In one or more embodiments, the templates are combined with the variables to obtain switch profiles as described below in FIG. 4.1. In one or more embodiments, a leaf switch is a network switch that connects directly to end devices (e.g., the servers (106)) and forwards their traffic to and from spine switches. In one or more embodiments, a spine switch is a network switch that connects to all leaf switches and forwards traffic between different leaf switches. In one or more embodiments, a super spine switch is a network switch that connects to all spine switches and forwards traffic between different spine switches. In one or more embodiments, the administrative system (100) includes the functionality to send the templates and variables to a master switch (e.g., 300 in FIG. 3) within the network fabric. Further, the administrative system (100) includes functionality to perform at least a portion of the methods shown in FIGS. 4.1-5. One of ordinary skill will appreciate that the administrative system (100) may perform other functionalities without departing from the scope of the disclosure.

In one or more embodiments, the storage device (104) includes the functionality to store data (e.g., checksum values for the network switches, etc.). The storage device (104) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. Further, the storage device (104) may include functionality to perform at least a portion of the methods shown in FIGS. 4.1-5. One of ordinary skill in the art will appreciate that the storage device (104) may perform other functionalities without departing from the scope of the embodiments disclosed herein.

In one or more embodiments, the servers (106) include computing device(s) (see e.g., FIG. 6) that includes multiple components including graphics processing units (GPUs), storage devices (e.g., Solid State Devices (SSDs), etc.) network interface cards (NIC), scheduling modules, controllers, and applications. In one or more embodiments, the servers (106) may include more components without departing from the scope of the disclosure. In one or more embodiments, the servers (106) include A-N servers. Further, the servers (106) may include functionality to perform at least a portion of the methods shown in FIGS. 4.1-5. One of ordinary skill in the art will appreciate that the servers (106) may perform other functionalities without departing from the scope of the embodiments disclosed herein.

Figure 6:
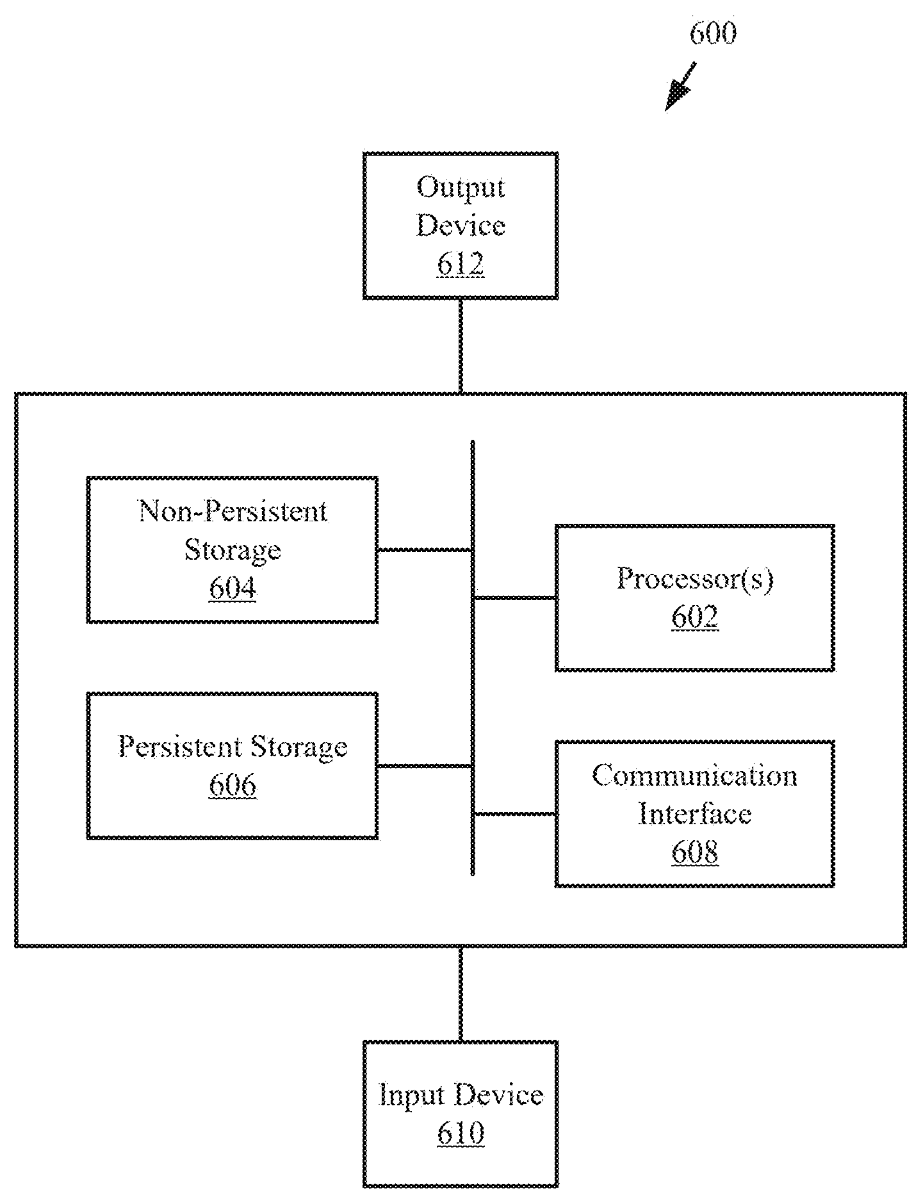
FIG. 6 shows a diagram of a computing system in accordance with one or more embodiments.

In one or more embodiments, the administrative system (100), the storage device (104), and the servers (106) are each implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the administrative system (100), the storage device (104), and the servers (106) described throughout this application.

In one or more embodiments, the administrative system (100), the storage device (104), and the servers (106) are each implemented as a logical device. The logical device may utilize the computing resources of any number of computing devices and thereby provide the functionality of the administrative system (100), the storage device (104), and the servers (106).

Figure 2:
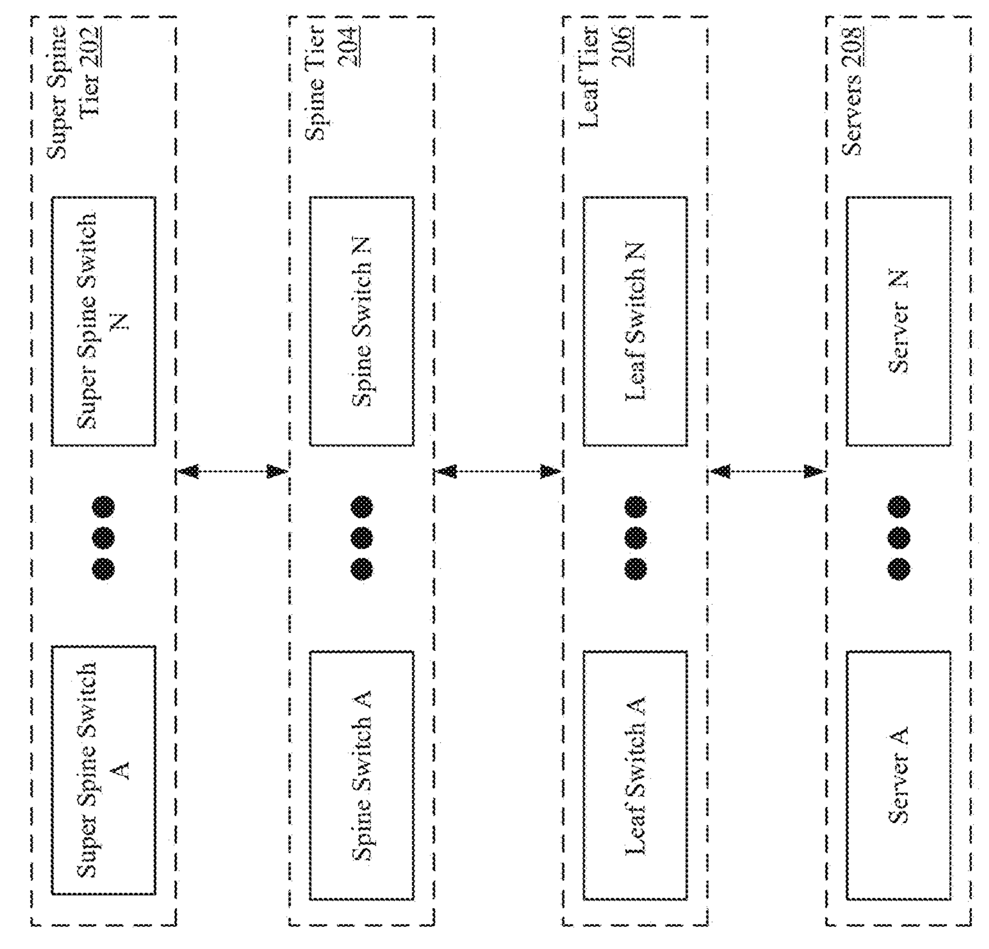
FIG. 2 shows a diagram of a network fabric in accordance with one or more embodiments.

Turung to FIG. 2, FIG. 2 shows a diagram of a network fabric (200) in accordance with one or more embodiments disclosed herein. In one or more embodiments, the network fabric (200) is a representation of network fabric (102) in FIG. 1. In one or more embodiments, a network fabric is a complete, interconnected mesh of network devices (e.g., servers (208), switches, etc.) that facilitates efficient data transmission and forms the underlying infrastructure for a network. In one or more embodiments, a switch (i.e, a network switch) is a physical, high-performance device configured to connect network servers, storage devices, and other network appliances within enterprise (e.g., on-premises and/or cloud computing infrastructure) environments. Said connection between enterprise environment elements may be implemented over one or more networks (e.g., local area networks (LANs), wide area networks (WANs) such as the Internet, mobile networks, etc.). In one or more embodiments, the network fabric (200) includes serves (208) with A-N servers. In one or more embodiments, the serves (208) are the same servers as servers 106 in FIG. 1. In one or more embodiments, the network fabric (200) includes a leaf tier (206) with A-N leaf switches. In one or more embodiments, a leaf switch is a network switch that connects directly to end devices (e.g., servers (208)) and forwards their traffic to and from spine switches. In one or more embodiments, the A-N servers of the servers (208) are connected to the A-N leaf switches of the leaf tier (206). In one or more embodiments, any connection scheme known in the art or discovered in the future may be used to connect the A-N severs of the servers (208) with the A-N leaf switches of the leaf tier (206). It should be appreciated, that the connection between the servers (208) and the leaf tier (206) directly links the A-N servers of the servers (208) to the network fabric (200), serving as the first step in data transmission within the network fabric (200). In one or more embodiments, the network fabric includes a spine tier (204) with A-N spine switches.

In one or more embodiments, the A-N leaf switches of the leaf tier (206) are connected to the A-N spine switches of the spine tier (204). In one or more embodiments, a spine switch is a network switch that connects to all leaf switches and forwards traffic between different leaf switches. In one or more embodiments, any connection scheme known in the art or discovered in the future may be used to connect the A-N leaf switches of the leaf tier (206) with the A-N spine switches of the spine tier (204). It should be appreciated, that the connection between the leaf tier (206) and the spine tier (204) links all of the A-N leaf switches of leaf tier (206) together via the A-N spine switches spine tier (204), thereby ensuring efficient communication and redundancy within the network fabric (200).

In one or more embodiments, the network fabric (200) includes a super spine tier (202) with A-N super spine switches. In one or more embodiments, the A-N spine switches of the spine tier (204) are connected to the A-N super spine switches of the super spine tier (202). In one or more embodiments, a super spine switch is a network switch that connects to all spine switches and forwards their traffic between different spine switches. In one or more embodiments, any connection scheme known in the art or discovered in the future may be used to connect the A-N spine switches of the spine tier (204) with the A-N super spine switches of the super spine tier (202). It should be appreciated, that the connection between the spine tier (204) and super spine tier (202) consolidates traffic from the A-N spine of the spine tier (204) switches by linking the A-N spine switches of the spine tier (204), thereby increasing scalability and redundancy across the entire network fabric (200). In one or more embodiments, all of the devices of the network fabric (200) are connected by network cables (e.g., fiber optic cables, copper cables, etc.). In one or more embodiments, the network fabric (200) is deployed in an air-gapped environment.

Figure 3:
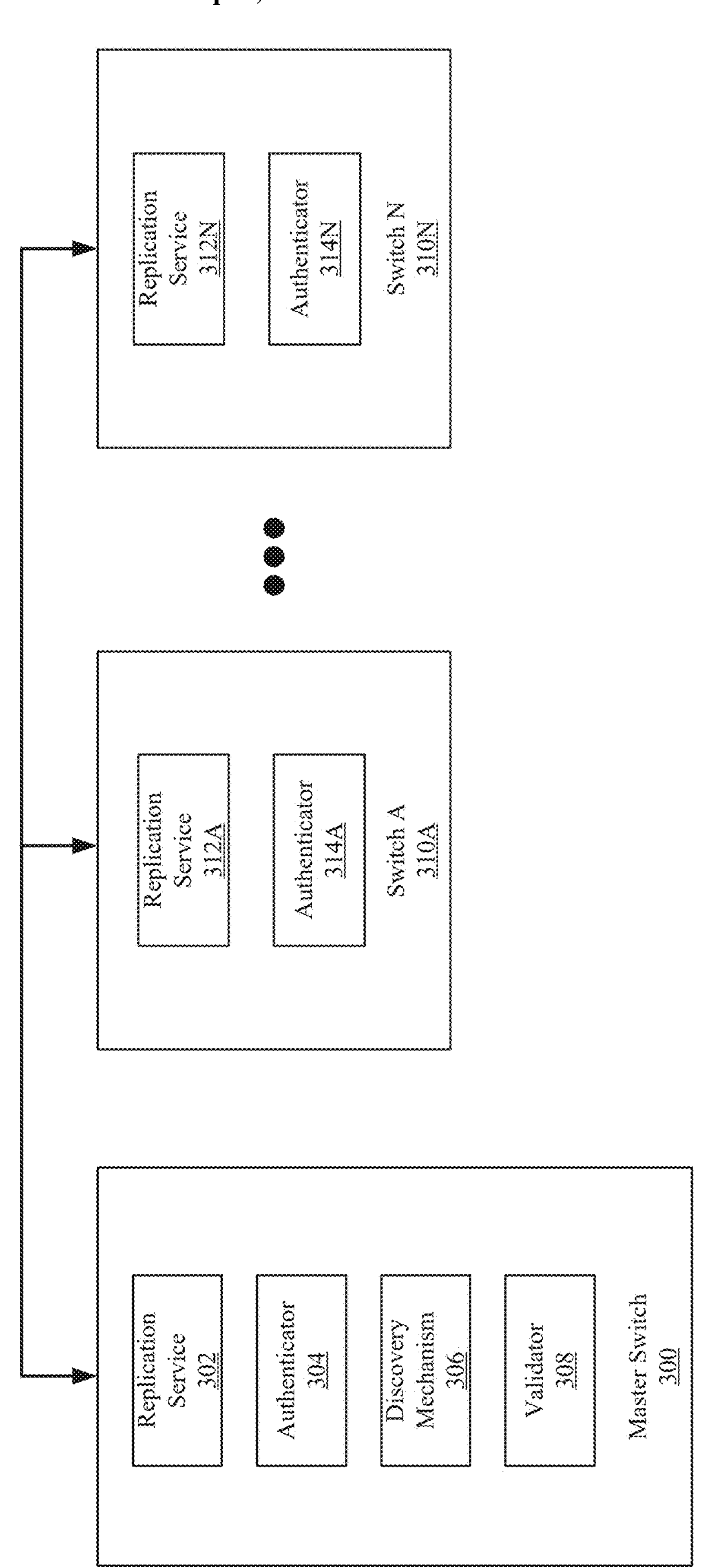
FIG. 3 shows a diagram of a master switch management system within a network fabric in accordance with one or more embodiments.

Turung to FIG. 3, FIG. 3 shows a diagram of a master switch management system within a network fabric (e.g., 200 in FIG. 2). The master switch management system may include a master switch (300), a replication service (302), an authenticator (304), a discovery mechanism (306), a validator (308), and switches (310). The switch management may include additional, fewer, and/or different components without departing from the scope of the embodiments disclosed herein.

In one or more embodiments, the master switch (300) includes the functionality to generate and send switch profiles to switches within the network fabric. In one or more embodiments, a switch (i.e, a network switch) is a physical, high-performance device configured to connect network servers, storage devices, and other network appliances within enterprise (e.g., on-premises and/or cloud computing infrastructure) environments. Said connection between enterprise environment elements may be implemented over one or more networks (e.g., local area networks (LANs), wide area networks (WANs) such as the Internet, mobile networks, etc.). In one or more embodiments, the master switch (300) may be any type of switch (e.g., leaf switches, spine switches, super spine switches, etc.) within the network fabric. In one or more embodiments, a leaf switch is a network switch that connects directly to end devices (e.g., servers) and forwards their traffic to and from spine switches. In one or more embodiments, a spine switch is a network switch that connects to all leaf switches and forwards traffic between different leaf switches. In one or more embodiments, a super spine switch is a network switch that connects to all spine switches and forwards traffic between different spine switches. Further, the master switch (300) is shown as a single switch; however, it should be appreciated that any number of master switches may be integrated into the network fabric. For example, one or more master switches may be implemented for each tier (i.e., the servers (208), the leaf tier (206), the spine tier (204), and the super spine tier (202), FIG. 2).

In one or more embodiments, the master switch is selected by an administrative system (e.g., 100 in FIG. 1). In one or more embodiments, switch profiles refer to switch configurations derived from templates with specific variables input for each switch or switch type in the network fabric. In one or more embodiments, templates refer to predefined configurations used to standardize configurations across switches in a network fabric (e.g., 200 in FIG. 2) which can be customized with specific variables. In one or more embodiments, variables refer to information specific to the switches in the network fabric (i.e., ASN numbers, router IDs, etc.). In one or more embodiments, the configurations are based on the tier in which the switch operates. In one or more embodiments, the variables can be consistent within each type of switch or vary for each switch. In one or more embodiments, the templates are combined with the variables to obtain switch profiles as described below in FIG. 4.1. In one or more embodiments, the master switch (300) includes the functionality monitor the status of the switches within the network fabric. Further, the master switch (300) may include functionality to perform at least a portion of the methods shown in FIGS. 4.1-5. One of ordinary skill in the art will appreciate that the master switch (300) may perform other functionalities without departing from the scope of the embodiments disclosed herein.

In one or more embodiments, the replication service (302) includes the functionality to apply switch profiles to the master switch. In one or more embodiments, applying the switch profiles to the master switch includes configuring the master switch using the template and the variables of the switch profile to obtain a final configuration of the master switch. Further, the replication service (302) may include functionality to perform at least a portion of the methods shown in FIGS. 4.1-5. One of ordinary skill in the art will appreciate that replication service (302) may perform other functionalities without departing from the scope of the embodiments disclosed herein. The replication service (302) may be implemented using hardware, software, or any combination thereof.

In one or more embodiments, the authenticator (304) includes the functionality to authenticate switches within the network fabric. In one or more embodiments, authenticating the switches includes determining status (i.e, operational state) of the switches, determining switch type (e.g., leaf, spine, etc.) of the switches, determining capabilities of each switch (e.g., how much traffic the switch can handle (throughput), processing power, port capacity, etc.), and determining the operating system (OS) that the switches are running. Further, the authenticator (304) may include functionality to perform at least a portion of the methods shown in FIGS. 4.1-5. One of ordinary skill in the art will appreciate that the authenticator (304) may perform other functionalities without departing from the scope of the embodiments disclosed herein. The authenticator (304) may be implemented using hardware, software, or any combination thereof.

In one or more embodiments, the discovery mechanism (306) includes the functionality to identify switches within the network fabric. In one or more embodiments, the discovery mechanism uses any discovery protocol known in the art or discovered in the future to identify the group of switches, including but not limited to multicast DNS (mDNS). Further, the discovery mechanism (306) may include functionality to perform at least a portion of the methods shown in FIGS. 4.1-5. One of ordinary skill in the art will appreciate that the discovery mechanism (306) may perform other functionalities without departing from the scope of the embodiments disclosed herein. The discovery mechanism (306) may be implemented using hardware, software, or any combination thereof.

In one or more embodiments, the validator (308) includes the functionality to determine if there have been any changes (e.g., changes in configuration, operating system (OS), etc.) to switches of the network fabric after the switches have been configured (i.e., the switch profiles have been applied). Further, the validator (308) may include functionality to perform at least a portion of the methods shown in FIGS. 4.1-5. One of ordinary skill in the art will appreciate that the validator (308) may perform other functionalities without departing from the scope of the embodiments disclosed herein. The validator (308) may be implemented using hardware, software, or any combination thereof.

In one or more embodiments, the switches (310) are representative of the switches within the network fabric 200 in FIG. 2. In one or more embodiments, the switches (310) do not include the master switch (300). In one or more embodiments, the switches (310) include leaf switches, spine switches, super spine switches, etc. In one or more embodiments, the switches (310) include A-N switches. In one or more embodiments, each of the A-N switches of the switches (310) includes a replication service (312) and an authenticator (313).

In one or more embodiments, the replication service (312) includes the functionality to apply a switch profile sent by the master switch (300) to the switch associated with the replication service (312). In one or more embodiments, applying the switch profile to the switch includes configuring the switch using the template and the variables of the switch profile to obtain a final configuration of the switch. Further, the replication service (312) may include functionality to perform at least a portion of the methods shown in FIGS. 4.1-5. One of ordinary skill in the art will appreciate that replication service (312) may perform other functionalities without departing from the scope of the embodiments disclosed herein. The replication service (312) may be implemented using hardware, software, or any combination thereof.

In one or more embodiments, authenticator (314) includes the functionality to send identifying information of the switch that the authenticator (314) is associated with to the master switch (300). In one or more embodiments, identifying information includes status (i.e., operational state) of the switch, switch type (e.g., leaf, spine, etc.), capabilities of the switch, and the operating system (OS) that the switch is running. Further, the authenticator (314) may include functionality to perform at least a portion of the methods shown in FIGS. 4.1-5. One of ordinary skill in the art will appreciate that authenticator (314) may perform other functionalities without departing from the scope of the embodiments disclosed herein. The authenticator (314) may be implemented using hardware, software, or any combination thereof.

Turning to FIG. 4.1, FIG. 4.1 shows a flowchart of a method for generating switch profiles in a network fabric (e.g., 200 in FIG. 2) in accordance with one or more embodiments disclosed herein. The method may be performed by, for example, a master switch (e.g., 300 in FIG. 3). Other components in the system may perform this method without departing from the scope of the disclosure.

While the various steps in the flowchart shown in FIG. 4.1 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIGS. 4.1-5.

In step 400, the master switch (e.g., 300 in FIG. 3) obtains templates and variables from an administrative system (e.g., 100 in FIG. 1). In one or more embodiments, the master switch is determined by the administrative system. In one or more embodiments, a switch (i.e, a network switch) is a physical, high-performance device configured to connect network servers, storage devices, and other network appliances within enterprise (e.g., on-premises and/or cloud computing infrastructure) environments. Said connection between enterprise environment elements may be implemented over one or more networks (e.g., local area networks (LANs), wide area networks (WANs) such as the Internet, mobile networks, etc.). In one or more embodiments, templates refer to predefined configurations used to standardize configurations across switches in the network fabric, which can be customized with specific variables. In one or more embodiments, variables refer to information specific to the switches in the network fabric (i.e., ASN numbers, router IDs, etc.). In one or more embodiments, the templates are combined with variables to obtain switch profiles as describing below. In one or more embodiments, the variables can be consistent within each type of switch (e.g., leaf switches, spine switches, super spine switches, etc.) or vary for each switch. In one or more embodiments, a leaf switch is a network switch that connects directly to end devices (e.g., servers) and forwards their traffic to and from spine switches. In one or more embodiments, a spine switch is a network switch that connects to all leaf switches and forwards traffic between different leaf switches. In one or more embodiments, a super spine switch is a network switch that connects to all spine switches and forwards traffic between different spine switches. In one or more embodiments, all of the switches share the same template, and each switch type shares the same variables. In one or more embodiments, the templates and variables may be tailored to each type of switch (eg., the leaf switches share the same variables and template, the spine switches share the same variables and template, etc.). In one or more embodiments, the templates and variables are presented in computer-readable code. In one or more embodiments, there is more than one master switch. In one or more embodiments, there is a master switch for each layer of the network fabric (e.g., a leaf master switch, a spine master switch, etc.). In one or more embodiments, the administrative system may send templates and variables to generate specific profiles depending on the needs of the system. Examples of such profiles include but are not limited to remote direct memory access (RDMA) over converged ethernet (ROCE) for low-latency networking, access control list (ACL) for traffic filtering, BGP for routing, etc. In one or more embodiments, the master switch obtains templates and variables from the administrative system by any means known in the art or discovered in the future.

In step 402, the master, which identifies a group of switches within the network fabric (e.g., 200 in FIG. 2). It should be appreciated that the master switch is not included in the group of switches. In one or more embodiments, the group of switches may include leaf switches, spine switches, super spine switches, etc. In one or more embodiments, the master switch identifies the group of switches using a discovery mechanism (e.g., 306 in FIG. 3). In one or more embodiments, the discovery mechanism uses any discovery protocol known in the art or discovered in the future to identify the group of switches, including but not limited to multicast DNS (mDNS). In one or more embodiments, the master switch identifies a group of switches using a network blueprint (i.e, a layout of the network fabric). In one or more embodiments, the master switch receives the network blueprint from the administrative system. In one or more embodiments, the master switch identifies a group of switches within the network fabric by any means known in the art or discovered in the future.

In step 404, the master switch authenticates the group of switches to obtain a group of authenticated switches. In one or more embodiments, the master switch uses an authenticator (e.g., 300 in FIG. 3) to authenticate the group of switches. In one or more embodiments, authenticating the group of switches includes determining the status (i.e, operational state) each switch, confirming the switch type (e.g., leaf, spine, etc.) of each switch, determining the capabilities each switch (e.g., how much traffic a switch can handle (throughput), processing power, port capacity, etc.), and determining the operating system (OS) that each switch is running. In one or more embodiments, the authenticator obtains the authentication information from an authenticator (e.g., 314 in FIG. 3) on each switch in the group of switches.

In one or more embodiments, the master switch authenticates the group of switches by any means known in the art or discovered in the future.

In step 406, the master switch generates one or more switch profiles using the templates and the variables based on the group of authenticated switches. In one or more embodiments, switch profiles refer to switch configurations derived from templates with specific variables input for each switch or switch type in the network fabric. In a non-limiting example, all of the leaf switches may share a switch profile, all of the spine switches may share a switch profile, etc. In one or more embodiments, different switch profiles may be generated based on the capabilities of each switch. In one or more embodiments, the switch profiles may be applied to the switches to obtain final switch configurations as described in FIG. 4.2. In one or more embodiments, the master switch generates one or more switch profiles by any means known in the art or discovered in the future.

In step 408, the master switch determines if any of the authenticated switches in the group of authenticated switches require an update. In one or more embodiments, a switch may need an update if it is running an outdated OS, a different OS than the master switch, etc. In one or more embodiments, the master switch determines if any of the authenticated switches in the group of authenticated switches require an update by any means known in the art or discovered in the future. If the result is Y es, then the method proceeds to step 410. If the result is NO, then the method proceeds to step 412.

As a result of the master switch determining that one or more authenticated switches of the group of authenticated switches require an update, the method arrives at step 410. In step 410, the master switch updates the one or more authenticated switches that require an update. In one or more embodiments, updating the one or more authenticated switches includes updating the authenticated switch's OS. In one or more embodiments, the master switch updates the authenticated switch by any means known in the art or discovered in the future.

In step 412, the master switch applies a switch profile of one or more switch profiles to itself. In one or more embodiments, the master switch applies the switch profile using the replication service (e.g., 302 in FIG. 3). In one or more embodiments, if there is more than one switch profile, the master switch applies the switch profile that matches the switch type of the master switch. In one or more embodiments, applying the switch profile refers to configuring the master switch using a template and variables of the switch profile to obtain the final configuration of the master switch. In one or more embodiments, the final configuration also includes variables inherent to the master switch (e.g., hardware ID, factory-assigned MAC address, etc.). In one or more embodiments, the master switch applies the switch profile to itself by any means known in the art or discovered in the future.

In one or more embodiments, the method proceeds to step 420 in FIG. 4.2 following step 412.

Turning to FIG. 4.2, FIG. 4.2 shows a flowchart of a method for applying switch profiles to switches in a network fabric (e.g., 200 in FIG. 2) in accordance with one or more embodiments disclosed herein. The method may be performed by, for example, a master switch (e.g., 300 in FIG. 3). Other components in the system may perform this method without departing from the scope of the disclosure.

While the various steps in the flowchart shown in FIG. 4.2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4.2 may be performed concurrently with one or more steps in FIGS. 4.1-5.

In step 420, the master switch selects an unconfigured switch from the group of authenticated switches. In one or more embodiments, the group of authenticated switches is the same group of authenticated switches as in FIG. 4.2. In one or more embodiments, an unconfigured switch refers to a switch that has not had a switch profile applied to it. In one or more embodiments, the master switch selects an unconfigured switch from the group of authenticated switches by any means known in the art or discovered in the future.

In step 422, the master switch determines the type of the unconfigured switch. In one or more embodiments, the switch types include but are not limited to leaf switches, spine switches, super-spine switches, etc. In one or more embodiments, the master switch determines the type of the configured switch by any means known in the art or discovered in the future.

In step 424, the master switch determines a switch profile of one or more switch profiles based on the switch type of the unconfigured switch. In one or more embodiments, the one or more switch profiles are the same one or more switch profiles as in FIG. 4.1. In one or more embodiments, there is only one switch profile; thus, the master switch does not have to determine which switch profile to apply. In one or more embodiments, the master switch determines the switch profile by any means known in the art or discovered in the future.

In step 426, the master switch sends the switch profile to the unconfigured switch. In one or more embodiments, the master switch sends the switch profile to the unconfigured switch by any means known in the art or discovered in the future. In one or more embodiments, when the unconfigured switch receives the switch profile, the unconfigured switch applies it to itself using its replication service (e.g., 312 in FIG. 3). In one or more embodiments, applying the switch profile refers to configuring the unconfigured switch using a template and variables of the switch profile to obtain a final configuration of the switch. In one or more embodiments, the final configuration also includes variables inherent to the switch (e.g., hardware ID, factory-assigned MAC address, etc.). In one or more embodiments, the switch profile is applied to the unconfigured switch by any means known in the art or discovered in the future.

In step 428, the master switch confirms that the switch profile has been successfully applied to the unconfigured switch. In one or more embodiments, the master switch confirms that the switch profile has been successfully applied to the unconfigured switch by comparing the switch profile that the unconfigured switch currently has with the switch profile that the master switch sent. In one or more embodiments, the master switch confirms that the switch profile has been successfully applied to the unconfigured switch by any means known in the art or discovered in the future.

In step 430, the master switch determines whether any unconfigured switches remain in the group of authenticated switches. In one or more embodiments, the master switch determines whether unconfigured switches by any means known in the art or discovered in the future. If the result is Y es, then the method proceeds to step 420. If the result is NO, then the method ends.

In one or more embodiments, the method ends following step 430.

Figure 5:
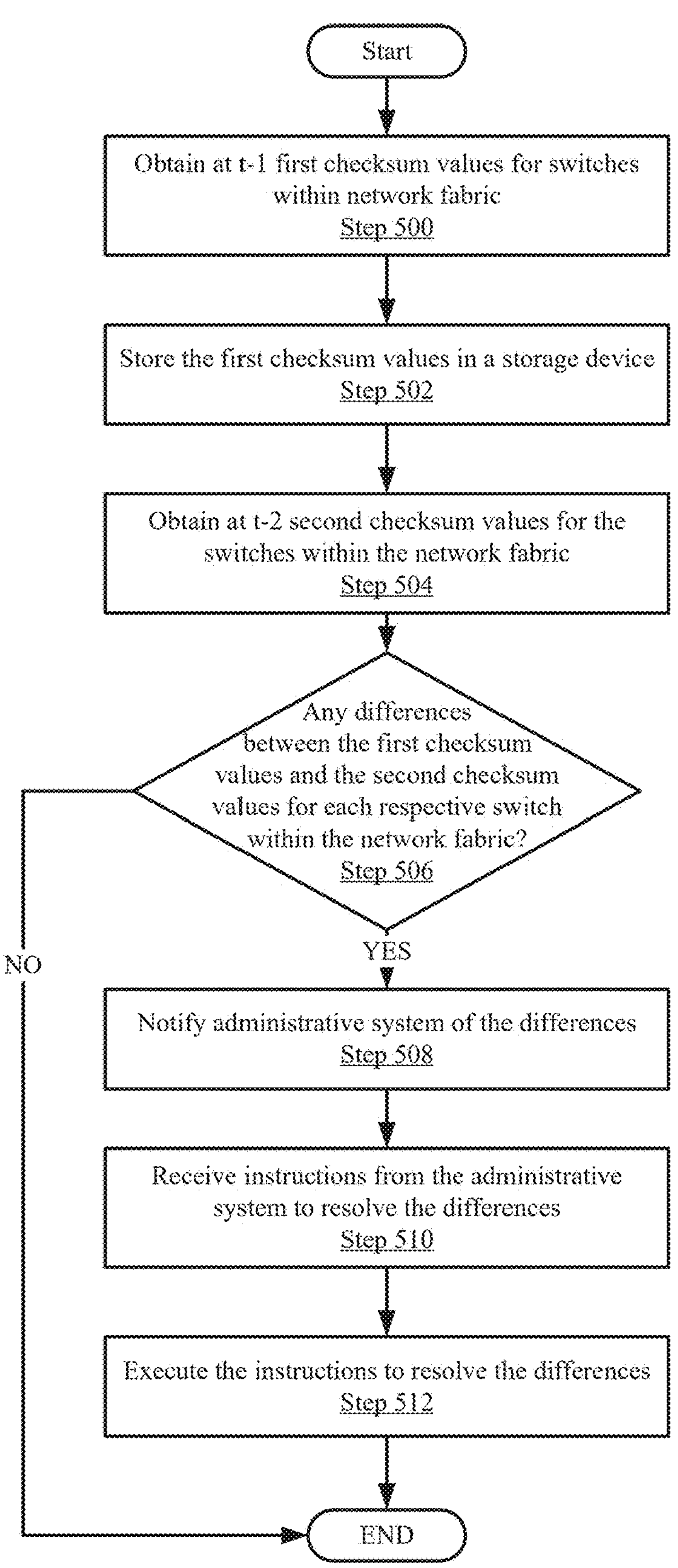
FIG. 5 shows a flowchart of a method for monitoring switches in a network fabric in accordance with one or more embodiments.

Turning to FIG. 5, FIG. 5 shows a flowchart of a method for monitoring switches in a network fabric (e.g., 200 in FIG. 1) in accordance with one or more embodiments disclosed herein. The method may be performed by, for example, a master switch (e.g., 300 in FIG. 3). Other components in the system may perform this method without departing from the scope of the disclosure.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 5 may be performed concurrently with one or more steps in FIGS. 2-4.

In step 500, the master switch obtains first checksum values at t−2 for switches within the network fabric. In one or more embodiments, checksum values refer to unique identifiers generated from data (e.g., configuration files, data traffic, etc.) at a given time (e.g., t−1). If there are any changes to the data, the checksum values will change. In one or more embodiments, the switches are configured switches from the group of configured switches in FIG. 4.2. In one or more embodiments, the master switch obtains first checksum values at t−1 for switches within the network fabric by any means known in the art or discovered in the future.

In step 502, the master switch stores the first checksum values in a storage device (e.g., 104 in FIG. 1). In one or more embodiments, the master switch stores the first checksum values in the storage device by any means known in the art or discovered in the future.

In step 504, the master switch obtains second checksum values at t−2 for switches within the network fabric. In one or more embodiments, the master switch obtains the second checksum values at t−2 for switches within the network fabric by any means known in the art or discovered in the future.

In step 506, the master switch determines whether there are any differences between the first checksum values and the second checksum values for each respective switch within the network fabric using a validator (e.g., 308 in FIG. 3). In one or more embodiments, a difference between two checksum values may indicate a change in a switch configuration since the checksum was taken at t−1, a change in operation system (OS) that a switch are running since the checksum was taken at t−1, etc. In one or more embodiments, the master switch determines whether there are any differences between the first checksum values and the second checksum values for each respective switch within the network fabric by any means known in the art or discovered in the future. In one or more embodiments, the master switch constantly obtains checksum values and compares them to the first checksum values to identify differences.

In step 508, the master switch notifies an administrative system (e.g., 100 in FIG. 1) of the difference. In one or more embodiments, the administrative system notifies a user of the differences via a graphical user interface (GUI). In one or more embodiments, the user provides instructions to the administrative system via the GUI based on the differences. In one or more embodiments, the master switch notifies an administrative system of the difference by any means known in the art or discovered in the future.

In step 510, the master switch receives instructions to resolve the differences. In one or more embodiments, the instructions may include re-pushing the configuration that the switch(s) had at t−1, re-pushing the OS that the switch(s) had at t−1, etc. In one or more embodiments, the master switch receives instructions by any means known in the art or discovered in the future.

In step 512, the master switch executes instructions to resolve the differences. In one or more embodiments, the master switch may be configured to notify the administrative system before executing the instructions. In one or more embodiments, the master switch executes instructions to resolve the differences by any means known in the art or discovered in the future.

In one or more embodiments, the method ends following step 512

Embodiments of the disclosure may be implemented using computing devices. Turning to FIG. 6, FIG. 6 shows a diagram of a computing device (600) in accordance with one or more embodiments. The computing device (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), input devices (610), output devices (612), and numerous other elements (not shown) and functionalities. Each of these components is described below.

In one embodiment, the computer processor(s) (602) may be an integrated circuit for processing instructions. For example, the computer processor(s) (602) may be one or more cores or micro-cores of a processor. The computing device (600) may also include one or more input devices (610), such as a touchscreen, access keyboard, mouse, microphone, touchpad, electronic pen, or any other type of input device. The communication interface (608) may include an integrated circuit for connecting the computing device (600) to a network fabric (e.g., 102 in FIG. 1) (e.g., a local area network (LAN), a wide area network (WAN) such as the Internet, mobile network, or any other type of network) and/or to another device, such as another computing device.

In one embodiment, the computing device (600) may include one or more output devices (612), such as a screen (e.g., a liquid crystal display (LCD), a plasma display, touchscreen, cathode ray tube (CRT) monitor, projector, or other display device), a printer, external storage, or any other output device. One or more of the output devices (612) may be the same or different from the input devices (610). The input and output device(s) (610, 612) may be locally or remotely connected to the computer processor(s) (602), non-persistent storage (604), and persistent storage (606). M any diverse types of computing devices exist, and the aforementioned input and output device(s) (610, 612) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

In the detailed description of the embodiments of the disclosure above, numerous specific details are set forth in order to provide a more thorough understanding of one or more embodiments of the disclosure. However, it will be apparent to one of ordinary skill in the art that the one or more embodiments of the disclosure may be practiced without these specific details. In other instances, well-known features have not been described in detail to avoid unnecessarily complicating the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connection between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage module, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims below.

What is claimed is:

1. A method for automating replication of network switch configurations within network fabrics, the method comprising:

obtaining, by a master switch, templates and variables from an administrative system, wherein a network fabric comprises a plurality of switches and wherein the master switch is one of the plurality of switches assigned a role of master;

identifying, by the master switch and in response to the obtaining, a group of switches within the network fabric, wherein the group of switches does not include the master switch;

authenticating, by the master switch, the group of switches to obtain a group of authenticated switches;

generating, by the master switch and based upon the group of authenticated switches, at least one switch profile using the templates and the variables;

making, by the master switch, a first determination, in response to the generating, that no authenticated switches of the group of authenticated switches require an update;

applying, by the master switch and in response to the first determination, the at least one switch profile to the master switch to obtain a configured master switch; and applying, by the configured master switch, the at least one switch profile to the group of authenticated switches to obtain a group of configured switches.

2. The method of claim 1, wherein applying the at least one switch profile to the group of authenticated switches comprises:

selecting, by the configured master switch, an unconfigured switch from the group of authenticated switches;

determining, by the configured master switch, a switch type of the unconfigured switch;

determining, by the configured master switch and based on the switch type, a switch profile of the at least one switch profiles;

sending, by the configured master switch, the switch profile to the unconfigured switch; and confirming, by the configured master switch, that the switch profile has been successfully applied to the unconfigured switch to obtain a configured switch, wherein the configured switch is in the group of configured switches.

3. The method of claim 2, wherein the switch type is one of a leaf switch, a spine switch, or a super spine switch.

4. The method of claim 1, wherein applying the at least one switch profile to the group of authenticated switches comprises:

selecting, by the configured master switch, an unconfigured switch from the group of authenticated switches;

determining, by the configured master switch, a switch group to which the unconfigured switch belongs;

determining, based on the switch group, a switch profile of the at least one switch profile;

sending the switch profile to the unconfigured switch; and confirming that the switch profile has been successfully applied to the unconfigured switch to obtain a configured switch.

5. The method of claim 1, further comprising:

obtaining, by the configured master switch, first checksum values of the group of configured switches at a first time (T1);

obtaining, by the configured master switch, second checksum values of the group of configured switches at second time (T2), where T2 is after T1;

making, by the configured master switch, a second determination that there are differences between the first checksum values and the second checksum values; and notifying, by the configured master switch and based on the second determination, the administrative system of the differences.

6. The method of claim 5, further comprising:

receiving, by the configured master switch and based on the notifying, instructions from the administrative system; and executing, by the configured master switch, the instructions to resolve the differences.

7. The method of claim 6, wherein the instructions include at least one of: reverting at least one configured switch of the group of configured switches to a previous configuration, updating at least one configured switch of the group of configured switches, and removing at least one configured switch of the group of configured switches from the network fabric.

8. The method of claim 1, wherein the master switch is one of a leaf switch, a spine switch, and a super spine switch.

9. The method of claim 1, wherein the master switch is a leaf switch and the switches in the group of switches are a combination of leaf switches, spine switches, and super spine switches.

10. A non-transitory computer readable medium (CRM) comprising computer readable program code, which when executed by a computer processor, enables the computer to perform a method for automating replication of network switch configurations within network fabrics, the method comprising:

obtaining, by a master switch, templates and variables from an administrative system, wherein a network fabric comprises a plurality of switches and wherein the master switch is one of the plurality of switches assigned a role of master;

identifying, by the master switch and in response to the obtaining, a group of switches within the network fabric, wherein the group of switches does not include the master switch;

authenticating, by the master switch, the group of switches to obtain a group of authenticated switches;

generating, by the master switch and based upon the group of authenticated switches, at least one switch profile using the templates and the variables;

making, by the master switch, a first determination, in response to the generating, that no authenticated switches of the group of authenticated switches require an update;

applying, by the master switch and in response to the first determination, the at least one switch profile to the master switch to obtain a configured master switch; and applying, by the configured master switch, the at least one switch profile to the group of authenticated switches to obtain a group of configured switches.

11. The non-transitory CRM of claim 10, wherein applying the at least one switch profile to the group of authenticated switches comprises:

selecting, by the configured master switch, an unconfigured switch from the group of authenticated switches;

determining, by the configured master switch, a switch type of the unconfigured switch;

determining, by the configured master switch and based on the switch type, a switch profile of the at least one switch profiles;

sending, by the configured master switch, the switch profile to the unconfigured switch; and confirming, by the configured master switch, that the switch profile has been successfully applied to the unconfigured switch to obtain a configured switch, wherein the configured switch is in the group of configured switches.

12. The non-transitory CRM of claim 11, wherein the switch type is one of a leaf switch, a spine switch, or a super spine switch.

13. The non-transitory CRM of claim 10, wherein applying the at least one switch profile to the group of authenticated switches comprises:

selecting, by the configured master switch, an unconfigured switch from the group of authenticated switches;

determining, by the configured master switch, a switch group to which the unconfigured switch belongs;

determining, based on the switch group, a switch profile of the at least one switch profile;

sending the switch profile to the unconfigured switch; and confirming that the switch profile has been successfully applied to the unconfigured switch to obtain a configured switch.

14. The non-transitory CRM of claim 10, further comprising:

obtaining, by the configured master switch, first checksum values of the group of configured switches at a first time (T1);

obtaining, by the configured master switch, second checksum values of the group of configured switches at second time (T2), where T2 is after T1;

making, by the configured master switch, a second determination that there are differences between the first checksum values and the second checksum values; and notifying, by the configured master switch and based on the second determination, the administrative system of the differences.

15. The non-transitory CRM of claim 14, further comprising:

receiving, by the configured master switch and based on the notifying, instructions from the administrative system; and executing, by the configured master switch, the instructions to resolve the differences.

16. A system for automating replication of network switch configurations within network fabrics, the system comprising:

persistent storage; and a computing device, comprising a processor and memory, programmed to:

obtain, by a master switch, templates and variables from an administrative system, wherein a network fabric comprises a plurality of switches and wherein the master switch is one of the plurality of switches assigned a role of master;

identify, by the master switch and in response to the obtaining, a group of switches within the network fabric, wherein the group of switches does not include the master switch;

authenticate, by the master switch, the group of switches to obtain a group of authenticated switches;

generate, by the master switch and based upon the group of authenticated switches, at least one switch profile using the templates and the variables;

make, by the master switch, a first determination, in response to the generating, that no authenticated switches of the group of authenticated switches require an update;

apply, by the master switch and in response to the first determination, the at least one switch profile to the master switch to obtain a configured master switch; and apply, by the configured master switch, the at least one switch profile to the group of authenticated switches to obtain a group of configured switches.

17. The system of claim 16, wherein applying the at least one switch profile to the group of authenticated switches comprises:

selecting, by the configured master switch, an unconfigured switch from the group of authenticated switches;

determining, by the configured master switch, a switch type of the unconfigured switch;

determining, by the configured master switch and based on the switch type, a switch profile of the at least one switch profiles;

sending, by the configured master switch, the switch profile to the unconfigured switch; and confirming, by the configured master switch, that the switch profile has been successfully applied to the unconfigured switch to obtain a configured switch, wherein the configured switch is in the group of configured switches.

18. The system of claim 17, wherein the switch type is one of a leaf switch, a spine switch, or a super spine switch.

19. The system of claim 16, wherein applying the at least one switch profile to the group of authenticated switches comprises:

selecting, by the configured master switch, an unconfigured switch from the group of authenticated switches;

determining, by the configured master switch, a switch group to which the unconfigured switch belongs;

determining, based on the switch group, a switch profile of the at least one switch profile;

sending the switch profile to the unconfigured switch; and confirming that the switch profile has been successfully applied to the unconfigured switch to obtain a configured switch.

20. The system claim 16, wherein the computing device is further programed to:

obtain, by the configured master switch, first checksum values of the group of configured switches at a first time (T1);

obtain, by the configured master switch, second checksum values of the group of configured switches at second time (T2), where T2 is after T1;

make, by the configured master switch, a second determination that there are differences between the first checksum values and the second checksum values; and notify, by the configured master switch and based on the second determination, the administrative system of the differences.

* * * * *